United States Patent
Haar et al.

(10) Patent No.: US 9,436,899 B2
(45) Date of Patent: Sep. 6, 2016

(54) RFID TRANSPONDER

(75) Inventors: Helmut Haar, Kainbach (AT); Kurt Bischof, Graz (AT); Heiko Scharke, Graz-Andritz (AT)

(73) Assignee: NXP B.V., Eindhoven (NL)

( * ) Notice: Subject to any disclaimer, the term of this patent is extended or adjusted under 35 U.S.C. 154(b) by 2766 days.

(21) Appl. No.: 11/911,489

(22) PCT Filed: Apr. 4, 2006

(86) PCT No.: PCT/IB2006/051031
§ 371 (c)(1),
(2), (4) Date: Oct. 12, 2007

(87) PCT Pub. No.: WO2006/109212
PCT Pub. Date: Oct. 19, 2006

(65) Prior Publication Data
US 2008/0204194 A1    Aug. 28, 2008

(30) Foreign Application Priority Data
Apr. 15, 2005  (EP) .................................. 05102988

(51) Int. Cl.
*H04Q 5/22*    (2006.01)
*G06K 19/07*    (2006.01)
(Continued)

(52) U.S. Cl.
CPC ......... *G06K 19/0723* (2013.01); *G06K 7/0008* (2013.01); *H04B 7/0802* (2013.01); *H04L 43/0864* (2013.01); *G06K 7/10039* (2013.01)

(58) Field of Classification Search
CPC ........... G06K 19/0723; G06K 7/0008; G06K 7/10039; G06K 7/10029; G06K 7/10217; H04L 43/0864; H04L 43/106; H04L 1/1607; H04B 7/0802

USPC ................ 340/10.1, 10.3, 572.1, 505, 573.1, 340/539.11, 539.1, 572.4, 10.33, 10.34, 340/10.42, 10.2, 10.52, 539, 573.4, 531; 235/375, 384, 385; 705/5; 707/3
See application file for complete search history.

(56) References Cited

U.S. PATENT DOCUMENTS 5,278,835 A * 1/1994 Ito et al. ..................... 370/311
5,307,349 A * 4/1994 Shloss ................. H04B 7/2643
340/10.2
(Continued)

FOREIGN PATENT DOCUMENTS

WO    03/085843 A    10/2003
WO    2004/021257 A    3/2004
(Continued)

OTHER PUBLICATIONS

Hendrik Van Eeden: "'Reader Talks First' vs. 'Tag Talks First' (RTF/TTF) RFID Protocols; White Paper" IPICO Identification, [Online] Aug. 26, 2002, p. 1-9, XP002394561 Pretoria Retrieved From the Internet: URL: http://www.ipico.co.za/technology/whitepapers/ttf%20white%20paper%20v5.pdf> [Retrieved on Aug. 11, 2006] The Whole Document.

*Primary Examiner* — Mirza Alam

(57) ABSTRACT

An integrated circuit (1a) for a transponder (1), wherein said integrated circuit (1a) is switchable between a TTF (transponder talks first) and an RTF (reader talks first)-mode within a switching timeframe (TF2), wherein the position of the switching timeframe (TF2) is shif table in relation to a timeframe (TF1) allocated to the TTF-mode. In a preferred embodiment, the switching timeframe (TF2) is before a timeframe (TF1) allocated to the TTF-mode by default. After initialization of the transponder (1), the switching timeframe (TF2) is switched to a position after the timeframe.

6 Claims, 3 Drawing Sheets

(51) Int. Cl.
*H04L 12/26* (2006.01)
*H04B 7/08* (2006.01)
*G06K 7/00* (2006.01)
*G06K 7/10* (2006.01)

(56) References Cited

U.S. PATENT DOCUMENTS

| | | | |
|---|---|---|---|
| 5,929,779 A | 7/1999 | MacLellan et al. | |
| 6,185,415 B1 * | 2/2001 | Boatwright | 455/410 |
| 6,198,381 B1 | 3/2001 | Turner et al. | |
| 6,611,556 B1 * | 8/2003 | Koerner et al. | 375/224 |
| 6,772,375 B1 * | 8/2004 | Banga | H04L 69/16 |
| | | | 714/18 |
| 6,963,270 B1 * | 11/2005 | Gallagher, III | G06K 7/10039 |
| | | | 340/10.2 |
| 7,394,382 B2 * | 7/2008 | Nitzan et al. | 340/572.8 |
| 7,652,556 B2 * | 1/2010 | Breitfuss | G06K 7/10297 |
| | | | 340/10.1 |
| 7,834,742 B2 * | 11/2010 | Amtmann | 340/10.3 |
| 2004/0140884 A1 | 7/2004 | Gallagher et al. | |
| 2007/0096876 A1 * | 5/2007 | Bridgelall | H04B 7/0802 |
| | | | 340/10.1 |
| 2009/0045913 A1 * | 2/2009 | Nelson | G06K 7/10217 |
| | | | 340/5.66 |

FOREIGN PATENT DOCUMENTS

| | | |
|---|---|---|
| WO | 2004/063971 A | 7/2004 |
| WO | WO 2004063971 A1 * | 7/2004 |

* cited by examiner

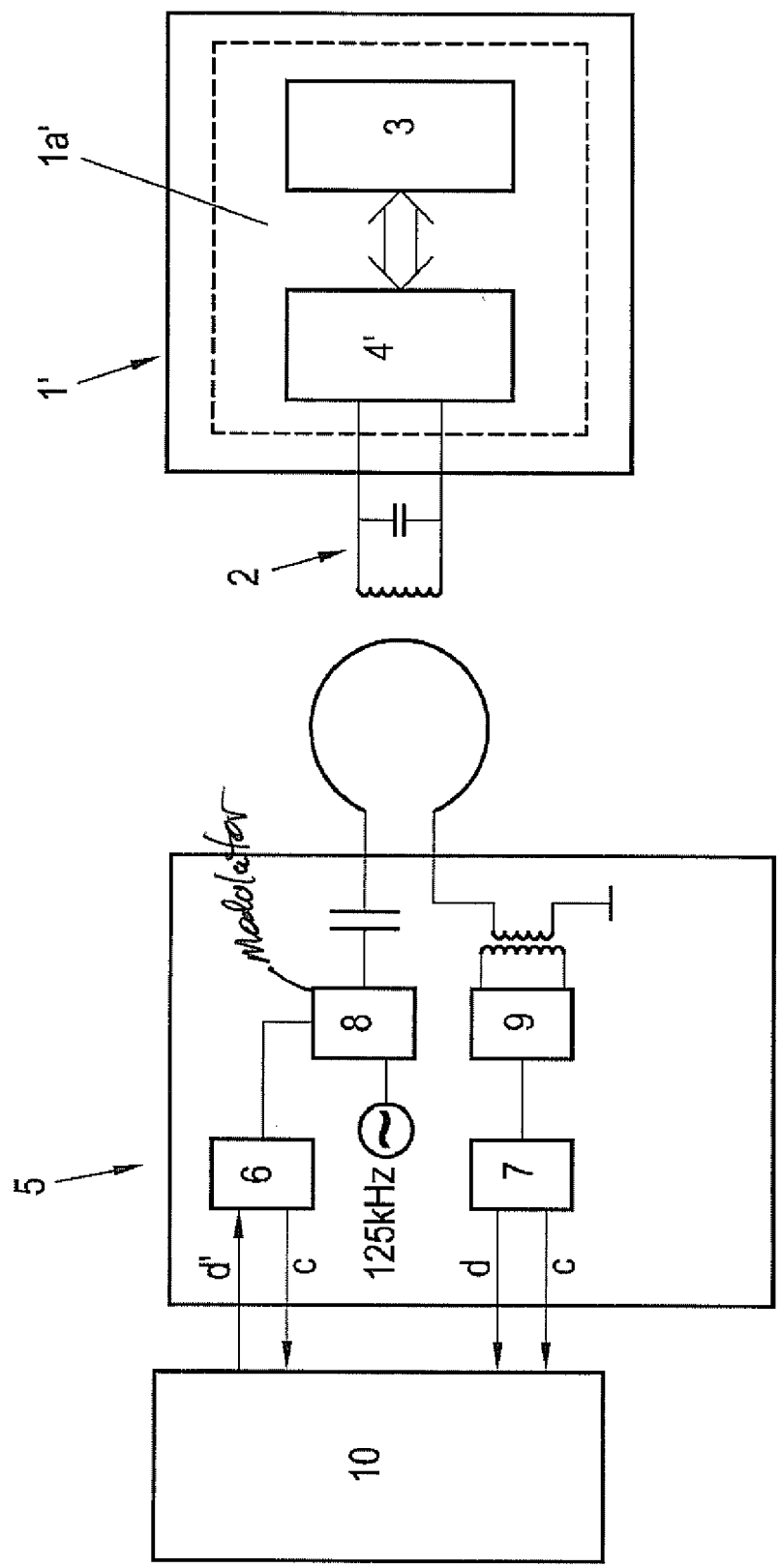
FIG. 1 (STATE OF THE ART)

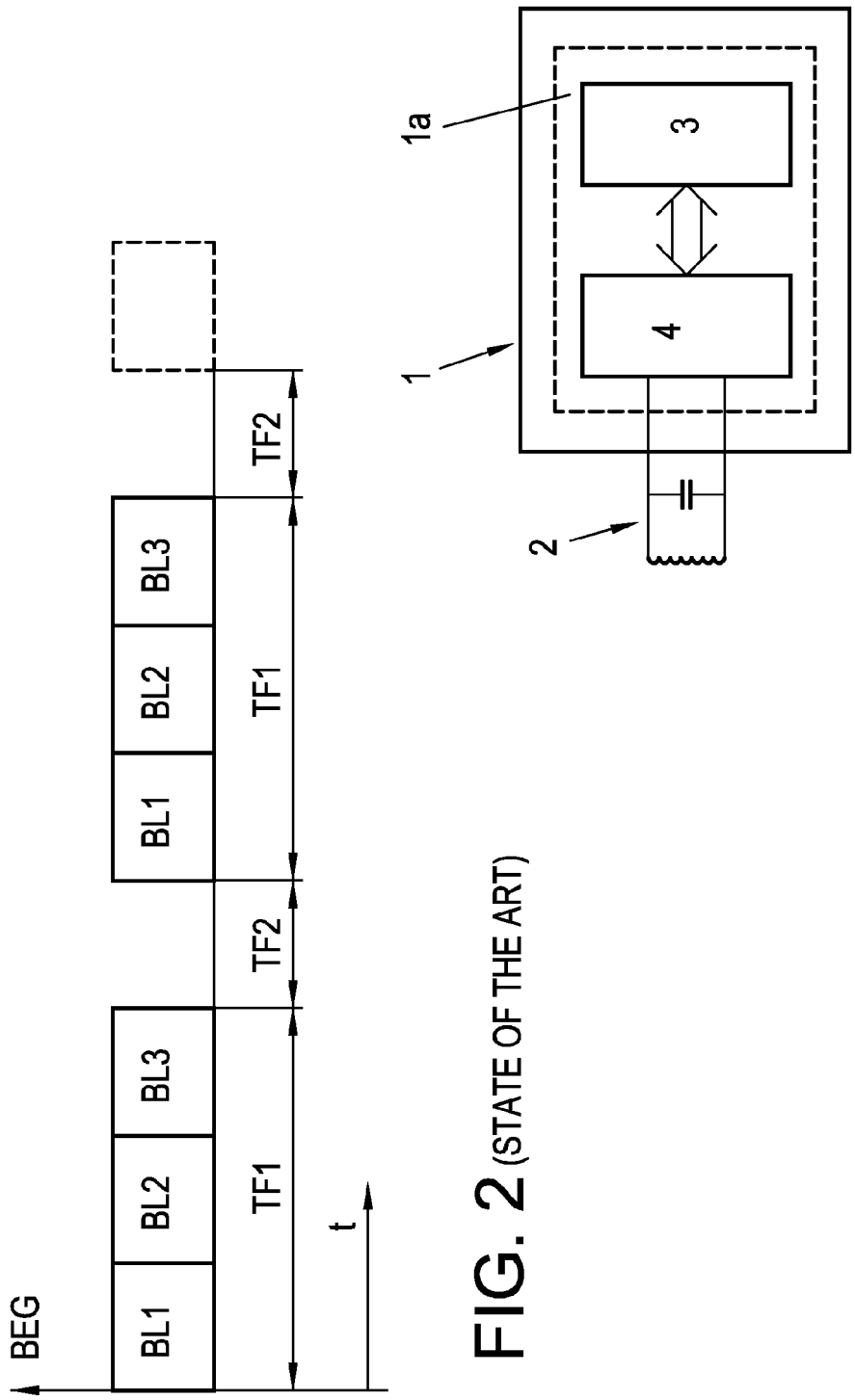

RFID TRANSPONDER

FIELD OF THE INVENTION

The invention relates to an integrated circuit for a transponder, which integrated circuit is switchable between a TTF and an RTF-mode within a switching timeframe.

The invention further relates to a transponder with an integrated circuit, which is switchable between a TTF and an RTF-mode within a switching timeframe.

The invention also relates to a method of initializing a transponder being switchable between a TTF and an RTF-mode within a switching timeframe.

BACKGROUND OF THE INVENTION

In this document, a transponder is understood to mean an electronic device, which is arranged to communicate with a transceiver when being in a communication range of said transceiver. In the present context, the communication range of the transceiver is understood to mean an alternating electromagnetic field supplied by the transceiver to energize and/or activate the transponder and/or transfer data to the transponder.

The transponder, such as the well-known RFID-tag ("Radio Frequency Identification Tag") is usually formed as a chip—an integrated circuit (IC)—with an antenna and optional housing material. The antenna is the physical interface for the radio waves to be received and transmitted. The construction of the antenna varies in dependence on the transponder itself and the frequency it operates on. Low-frequency antennas are often made of wire coils, whereas high-frequency antennas are usually made of etched coils or printed with conducting inks. Depending on the application, the transponder may have a housing of glass, or epoxy, or it may be a label, a card, etc. In principle, the transponder may be passive, battery-assisted, or active.

If the transponder is passive, it gets all its power from a signal sent by the transceiver, for example, a reading/writing unit for RFID-tags, also called "reader". The transponder, using this radio wave to carry the data, is also able to convert it into power. This means that a passive transponder is only powered when it is within the communication range of the transceiver.

In contrast, active transponders have their own power source and may have longer ranges and larger memories than passive tags. The transponder communicates with the transceiver, using what is called the "air interface". This is a specification for wireless communication between the transceiver and the transponder and includes the frequency of the carrier, the bit data rate, the method of encoding and any other parameters that may be needed. For example, ISO 18000 is the standard for the air interface for item management.

Communication between the transponder and the transceiver can take place in different ways. Some conventional RFID-transponders are designed to operate in an RTF-mode ("Reader Talk First Mode") or in a TTF-mode ("Transponder Talk First Mode").

A transponder operating in the TTF-mode announces itself to the transceiver by transmitting an identification (ID) when it detects the presence of the transceiver. In the case of a passive transponder, the transponder talks as soon as it gets power. In other words, a passive transponder is detected by the fact that the transponder powers up when it enters the transceivers communication range.

An active transponder may talk all the time. In the TTF-mode, the active transponder could thus become active on its own, without having to be interrogated for this purpose by the transceiver.

In the RTF-mode, the transponder just waits until it receives a request from the transceiver. This means that, even though the transponder may be activated, it does not talk until it receives a request. In the RTF-mode, data can be written to or read from the transponder by the transceiver.

Since transponders that merely work in the TTF-mode cannot be switched to a reading/writing mode, transponders of this type do not have additional features such as direct offline data storage on the transponder. To overcome this drawback, transponders have been introduced that can be switched from a TTF-mode to an RTF-mode by means of a switching command supplied by the transceiver. Such "switchable" transponders are known as state of the art by the name of "PCF 7930" (a transponder produced by Philips). A state-of-the-art communication system using the PCF 7930 transponder will be elucidated hereinafter, wherein:

FIG. 1 is a block circuit diagram of a communication system according to the state of the art.

FIG. 2 is a flow chart of a communication between a transponder and a transceiver according to the state of the art.

In FIG. 1, the communication system comprises a transponder 1' of the PCF7930 type. The transponder 1' comprises a resonant circuit 2 and an integrated circuit (IC) 1a'. Two functions are integrated on the IC 1a' of the transponder 1'. The first function is an Electrically Erasable Programmable Read-Only Memory (EEPROM) 3. The second function is a contactless interface (CIF) 4' for power supply, clock recovery and data handling.

The transponder 1' can be switched between a TTF and an RTF-mode by means of a transceiver 5. The transceiver 5 comprises a data coder 6 and a data decoder 7 as well as a modulator 8 and a demodulator 9 for data transmission. The transceiver 5 generates an RF-field with a predefined frequency, e.g. 125 kHz. The transceiver 5 is arranged to supply a clock signal c and output data d received from the transponder 1' to a computer 10 and to receive input data d' from the computer 10.

FIG. 2 shows the transponder 1' by default in the TTF-mode upon its activation. The TTF-mode is activated when the transponder 1' senses the magnetic field of the transceiver 5. The point of time when the transponder 1' is activated or enters the communication range of the transceiver 5 is indicated by BEG in FIG. 2. The direction of the increase of time t is indicated by means of an arrow in FIG. 2. After its activation, the transponder 1' cyclically sends a number of data blocks, e.g. BL1, BL2, BL3, within a TTF timeframe TF1 to the transceiver 5. When the last data block BL3 is transmitted, a short switching timeframe TF2 with no data transfer is given before the transmission of the first data block BL1 starts again. In the switching timeframe TF2, the transponder 1' can be switched to an RTF-mode by means of a switching pulse given by the transceiver 5. The switching pulse may also be a switching command. In the RTF-mode, data can be written into the EEPROM of the transponder 1'.

The transceiver 5 recognizes the switching timeframe TF2 due to the fact that no data are received during this time. If no switching pulse is given in the switching timeframe TF2, the transponder 1' remains in the TTF-mode and continues transmitting its data to the transceiver 5.

It is a drawback of the above-mentioned embodiment that initialization of the transponder takes a long time. Initialization of the transponder means that an initial condition is established, which is necessary for further use of the transponder, e.g. initial programming of the transponder or setting or activating a password for memory access, etc. Initialization is usually done by storing initial data to the transponder, necessary for its further use, such as a transponder ID, etc. Since the transponder is by default in the TTF-mode, one has to wait for the switching timeframe before the initial data can be stored to the transponder.

In situations in which a manufacturer or a retailer intends to initialize millions of transponders, the additional waiting time for the switch window becomes a substantial cost factor.

OBJECT AND SUMMARY OF THE INVENTION

It is an object of the invention to provide an integrated circuit of the type mentioned in the opening paragraph, a transponder of the type mentioned in the second paragraph and a method of the type mentioned in the third paragraph, which obviate the drawbacks described hereinbefore.

To achieve the object described above, an integrated circuit according to the invention has such characteristic features that it can be characterized as follows:

An integrated circuit for a transponder, wherein said integrated circuit is switchable between a TTF and an RTF-mode within a switching timeframe, wherein the position of the switching timeframe is shiftable in relation to a timeframe allocated to the TTF-mode.

To achieve the object described above, a transponder according to the invention has such characteristic features that it can be characterized as follows:

A transponder with an integrated circuit according to the invention.

To achieve the object described above, a method according to the invention has such characteristic features that it can be characterized as follows:

A method of initializing a transponder, said transponder being switchable between a TTF and an RTF-mode within a switching timeframe, wherein the position of the switching timeframe is shifted in relation to a timeframe allocated to the TTF-mode after writing initial data to the transponder and/or establishing an initial condition, necessary for further use of the transponder.

The characteristic features of the invention create the advantage that the time needed for initialization of the transponder is significantly decreased. Furthermore, the advantage is achieved that the decreased amount of time needed for initialization of the transponder contributes to lower manufacturing costs.

According to an embodiment of the invention, the position of the switching timeframe is shiftable between a position before the timeframe allocated to the TTF-mode and a position after said timeframe allocated to the TTF-mode. By shifting the position of the switching timeframe between a position before the timeframe allocated to the TTF-mode and a position after said timeframe allocated to the TTF-mode after writing initial data to the transponder and/or establishing an initial condition, the position of the switching timeframe can be easily changed in accordance with the requirements of use.

According to a preferred embodiment of the invention, the position of the switching timeframe is shiftable from a position before the timeframe allocated to the TTF-mode to a position after said timeframe allocated to the TTF-mode, wherein the switching timeframe is beneficially shifted from a position before a timeframe allocated to the TTF-mode to a position after said timeframe allocated to the TTF-mode after writing initial data to the transponder and/or establishing an initial condition, necessary for further use of the transponder, and wherein a default position of the switching timeframe is before the time-frame allocated to the TTF-mode before initialization of the integrated circuit. This creates the advantage that the integrated circuit can be initialized very quickly and also identified very quickly by a transceiver after entering the communication range of the transceiver.

However, it has proved to be particularly advantageous if the position of the switching timeframe is shiftable from a position after the timeframe allocated to the TTF-mode to a position before the timeframe allocated to the TTF-mode, wherein the switching timeframe is beneficially shifted from a position after a timeframe allocated to the TTF-mode to a position before said timeframe allocated to the TTF-mode after writing initial data to the transponder and/or establishing an initial condition, necessary for further use of the transponder. This creates the advantage that, after its initialization, the integrated circuit can be switched to a mode in which data can be written to the integrated circuit immediately after entering the communication range of a transceiver.

These and other aspects of the invention are apparent from and will be elucidated with reference to the embodiments described hereinafter.

BRIEF DESCRIPTION OF THE DRAWINGS

The invention will be described in greater detail hereinafter, by way of non-limiting example, with reference to the embodiments shown in the drawings.

FIG. 1 shows a block circuit diagram of a communication system according to the state of the art.

FIG. 2 shows a flow chart of a communication between a transponder and a transceiver according to the state of the art.

FIG. 3 shows a transponder according to the invention.

Figure 4:
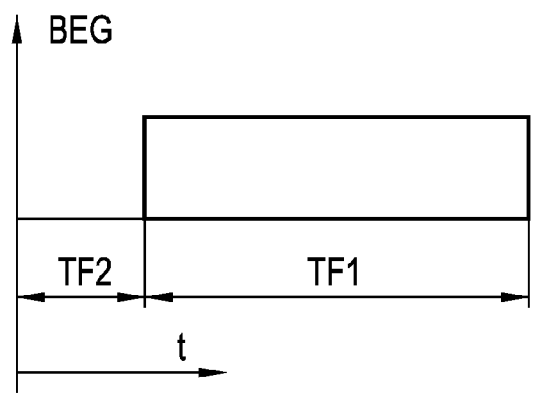
FIG. 4 shows a timing diagram of internal states of a transponder according to the invention before its initialization.

The Figures are schematic and not drawn to scale, and the identical reference numerals in different Figures refer to corresponding elements. It will be evident to those skilled in the art that alternative but equivalent embodiments of the invention are possible without departing from the true inventive concept, and that the scope of the invention is limited by the claims only.

DESCRIPTION OF EMBODIMENTS

In FIG. 3, the transponder 1 comprises an IC 1a with an EEPROM 3 and a contactless interface (CIF) 4 for power supply, clock recovery and data handling. Furthermore, the transponder 1 comprises a resonant circuit 2. The IC 1a is switchable between a TTF and an RTF-mode within a switching timeframe TF2.

In contrast to the state-of-the-art transponder 1', the position of the switching timeframe TF2 can be shifted in relation to the timeframe TF1 allocated to the TTF-mode. The position of the switching timeframe TF2 can thus be shifted between a position before a timeframe allocated to the TTF-mode TF1 and a position after said timeframe TF1 allocated to the TTF-mode.

According to a preferred embodiment of the invention, illustrated in FIG. 4, a default position of the switching timeframe TF2 appears chronologically before the timeframe TF1 allocated to the TTF-mode before initialization of the transponder 1 takes place. The direction of the increase of time t is indicated by means of an arrow in FIG. 4, while the point of time of activation of the transponder 1 is indicated by BEG.

This has the advantage that the transponder 1 can be configured in a very quick way, because a transceiver 5 used for initialization of the transponder 1 does not have to wait until the TTF-mode is interrupted. For the purpose of initialization, an "initialization bit" can be set in a data memory of the CIF. After finishing the initialization, the "initialization bit" is deleted.

Figure 5:
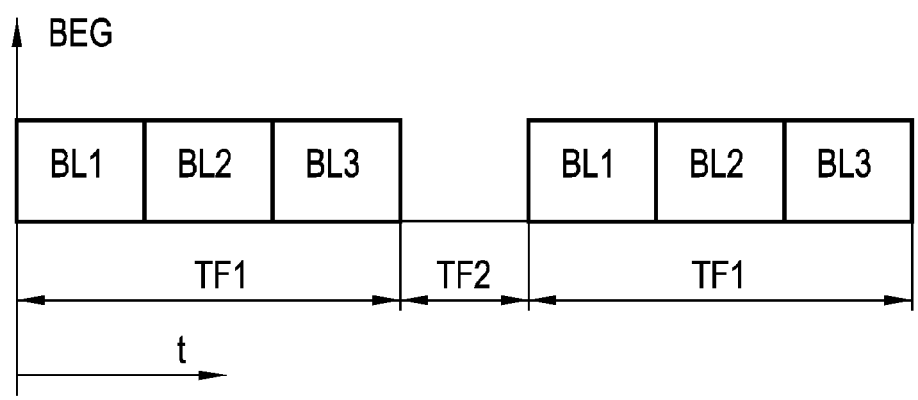
FIG. 5 shows a timing diagram of internal states of a transponder according to the invention after its initialization is finished.

According to a preferred embodiment of the invention, the switching timeframe TF2 is switched from a position before a timeframe TF1 allocated to the TTF-mode (FIG. 4) to a position after said timeframe TF1 allocated to the TTF-mode (FIG. 5) after writing initial data to the transponder 1. This may be achieved by deleting the aforesaid "initialization bit", which causes the time slot TF2 to be shifted after the time slot TF1. This means that, after initialization of the transponder 1 is finished, the timeframe TF1 allocated to the TTF mode comes chronologically before the switching timeframe TF2 of the transponder 1. This has the advantage that the transponder 1 can be identified very quickly, because it does not have to wait for a possible switching signal supplied by a transceiver 5 when entering a communication range of the transceiver 5, which entry is detected by the CIF 4 by means of an output signal of the resonant circuit 2. According to the embodiment of the invention mentioned in this paragraph, the time series of appearance of the timeframes TF1, TF2 upon entry into the communication range of the transceiver 5 is: TF1, TF2, TF1, TF2, . . . . It should be noted that the data blocks BL1, BL2, BL3 may in principle be identical (BL1=BL2=BL3) or may comprise different data. It is also possible that the same physical data block is transmitted several times in a consecutive way.

After finishing the initialization of the transponder 1, the operating schedule for communication with a transceiver 5 is the same as is the case with the transponder 1' according to the state of the art.

However, according to another embodiment of the invention, the switching timeframe TF2 may be shifted from an initial position after the timeframe TF1 to a position before the timeframe TF1. This means that the IC 1a and the transponder 1 can be switched to a mode in which the switching timeframe TF2 appears first upon entry into the communication range of the transceiver 5. According to the embodiment of the invention mentioned in this paragraph, the time series of appearance of the timeframes TF1, TF2 upon entry into the communication range of the transceiver 5 is: TF2, TF1, TF2, TF1, . . . .

According to a further embodiment of the invention, the position of the switching timeframe TF2 may be switched between a position before the timeframe TF1 and a position after the timeframe TF1 at any time. That means that the switching timeframe TF2 can be switched to and from a position before or after the timeframe TF1 allocated to the TTF-mode. The chronology of appearance of the switching timeframe TF2 and the timeframe TF1 allocated to the TTF-mode can thus be changed in accordance with the requirements of the application in use.

The functionality of shifting the chronological position of the switching timeframe TF2 is integrated in the IC 1a, for instance, by means of suitable programming, or hardwired. The switching timeframe TF2 can be shifted by means of a command transmitted to the transponder 1 when being within the communication range of a transceiver 5 or automatically in accordance with predefined conditions, e.g. the number of entries into a communication range of a transceiver 5, or implicitly upon the first writing operation, etc.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. Use of the verb "comprise" and its conjugations does not exclude the presence of elements or steps other than those stated in any claim or the specification as a whole. The singular reference of an element does not exclude the plural reference of such elements, and vice-versa. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of initializing a transponder, the transponder being switchable between a TTF mode and an RTF mode within a switching timeframe, the method comprising:
    shifting a position of the switching timeframe from a first position to a second position relative to a timeframe allocated to the TTF mode, wherein the second position is different from the first position and at least one predefined condition results in shifting of the switching timeframe.

2. The method as claimed in claim 1, further comprising:
    shifting the position of the switching timeframe from a position after the timeframe allocated to the TTF mode to a position before the timeframe allocated to the TTF mode.

3. The method as claimed in claim 1, further comprising:
    shifting the position of the switching timeframe from a position before the timeframe allocated to the TTF mode to a position after the timeframe allocated to the TTF mode.

4. The method as claimed in claim 1, wherein a default position of the switching timeframe is before the timeframe allocated to the TTF mode.

5. The method of claim 1, wherein the at least one predefined condition comprises exceeding a number of entries within a communication range of a transponder.

6. The method of claim 1, wherein the at least one predefined condition comprises a first writing operation.

* * * * *